Nov. 8, 1938.     E. A. BRADEN     2,136,071
METALLIC TRUSS BEAM AND JOINT THEREFOR
Filed June 14, 1937
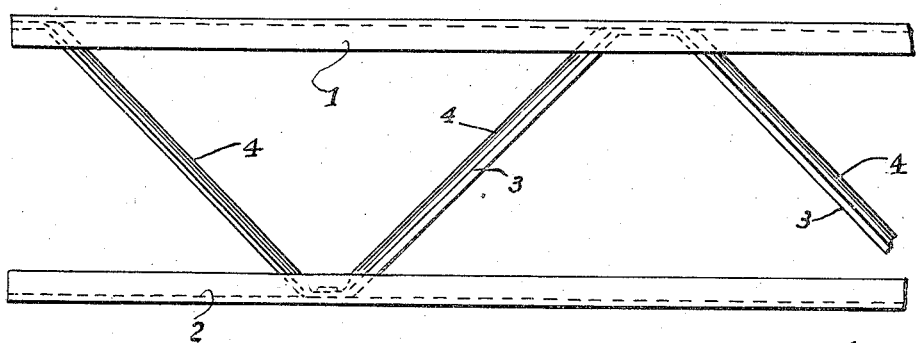
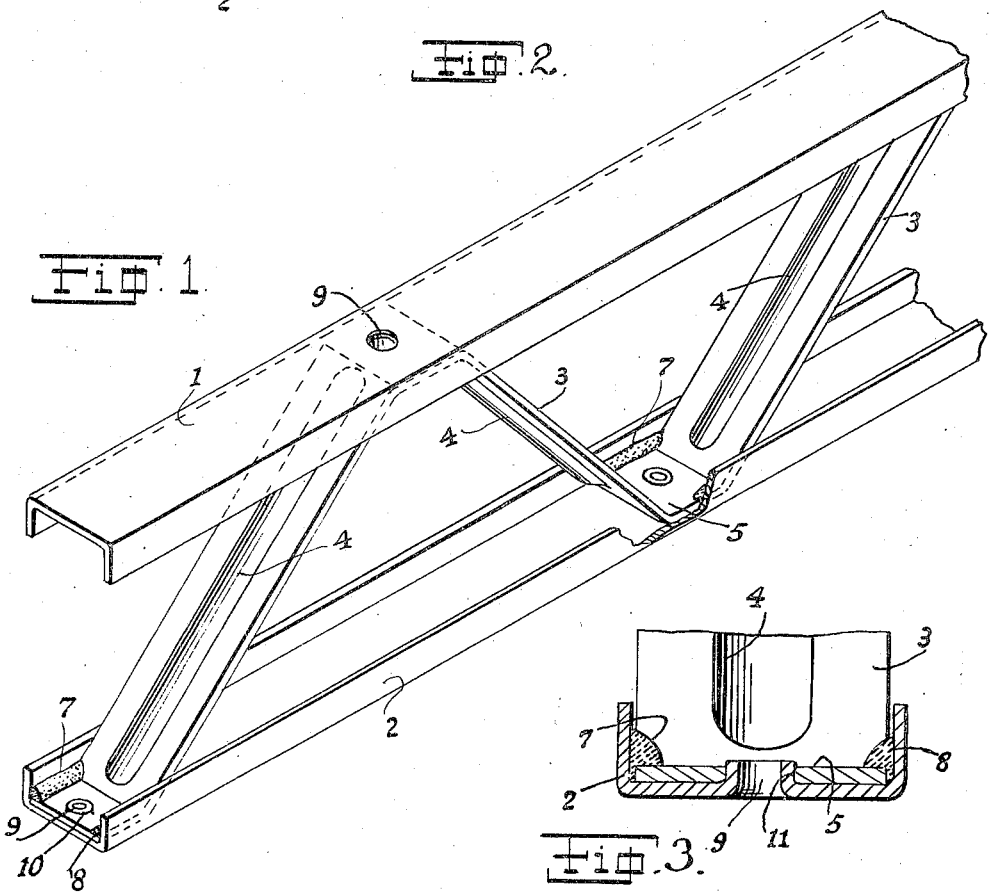
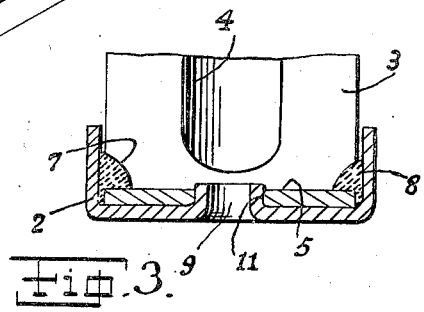
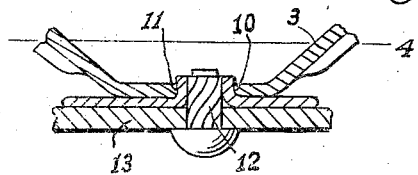
Elmer A. Braden
INVENTOR.
BY A. B. McCall
ATTORNEYS.

Patented Nov. 8, 1938

2,136,071

UNITED STATES PATENT OFFICE 2,136,071

METALLIC TRUSS BEAM AND JOINT THEREFOR

Elmer A. Braden, Springfield, Ill.

Application June 14, 1937, Serial No. 148,041

1 Claim. (Cl. 189—37)

My invention relates to truss beams and more especially to metallic truss beams; an object being in my device to provide means by which a relatively small truss beam may be made, utilizing relatively thin and light weight material therefor.

The purpose of my invention is to provide a truss beam construction wherein there is found a maximum of beam strength in a minimum of material weight in the beam.

A further purpose of my invention is to provide a beam structure wherein the intermediate trussing member connecting the spaced parallel plates of the beam may be continuous in its formation in zig-zag arrangement and yet bonded with the parallel channel plates of the beam in a manner that is positive in its connection with a maximum of strength in its bonding connection.

A particular object in my invention is to provide in a metallic truss beam having parallel spaced channel plates bonded together with a continuous zig-zag type trussing member, a joint construction of the shearing weld type which will provide a snugly fitting substantial and efficient bonding relation between the trussing member and the parallel spaced channel plates of the beam.

I attain the objects of my invention in the annexed specification, recited in the claim and illustrated in the accompanying drawing wherein like reference numerals indicate like parts in the several figures.

Referring to the figures:

Fig. 1 is a perspective of one of my assembled metallic truss beams and showing in a cut-away details of the fitting relation between the trussing member and its bonding relation with the parallel channel plates.

Fig. 2 is a side elevation of one of my truss beams.

Fig. 3 is an enlarged detail cross section of one of the bonding joints of the shearing weld type and showing the close fitting relation of the channel plate inner faces and the trussing member as it is shear welded thereto.

Fig. 4 is a detail of a portion of a longitudinal section through the center of one of the connections of the trussing member with one of the channel plates showing a very effective and practical method of centering the contact portions together as well as a means of providing a substantial additional support for structural members that may be attached to the truss beam by means of a drive screw or other suitable means of securing structural members to my truss beam.

I am aware of the existence of other forms of truss beam construction and I am also aware of the problem that has existed in the manufacture of truss beams heretofore in the attempt to make such truss beams small enough for desired use with the materials that were thought to be necessary in their construction.

In my invention I am providing means by which relatively small truss beams may be made and utilized in various situations in household frame construction and made of a material that is comparatively thin both for the channel plates and the zig-zag brace trussing member.

In my invention, I find it possible to utilize a truss beam construction that is no larger than a 2″ x 6″ joist member and I find it wholly practical to use my truss beam construction of this small size in residence frame work and other structural frame work where strength and durability are desired.

In addition to this, I have found it in numerous cases very desirable to fill in the spaces between the channel plate members of my truss beam construction with insulation material which may even cover the zig-zag trussing members.

There are numerous selective adjustments that may be made in the forms and fitting relations of the various truss beam members of my invention, depending upon what kind of bracing would be desired and where the truss beam construction with insulation material which may even cover the zig-zag trussing members.

There are numerous selective adjustments that may be made in the forms and fitting relations of the various truss beam members of my invention, depending upon what kind of bracing would be desired and where the truss beam member would be secured in place for obtaining the strength and support that is desired of it.

I find it obviously serviceable in various other adaptations in addition to structural frame work and in fact, the features which make it possible to make up the truss beam members with such small relatively thin channel plate members and zig-zag trussing members very materially increases the scope of use thereof.

My truss beam construction provides for the use of relatively small thin materials, for instance, where channel plate members 1 and 2 could be made of a non-rusting material having about one-eighth of an inch thickness or less if desired and the zig-zag trussing member 3 having a longitudinal strengthening channel 4 may be about the same thickness as the channel plates and provided with intermediate flat portions 5 adapted to fit flat across the inner face 6 of the channel plates and this flat portion 5 of the trussing member 3 will normally be only slightly less in width than the width of the space between the opposite inner faces of the channel plates.

Thus, when the relatively flat portion 5 of trussing members 3 are welded in their fitting position so that the welding joint may be effectively made as a shearing weld, this snug fitting relationship between the trussing member 3 and its contacting flat portion 5 against the inner face 6 of the channel plates 1 and 2 will provide a maximum of strength for the trussing beam to hold it together under various stresses.

This shearing weld 7 on one side and 8 on the other makes it impossible to remove the trussing member from the channel plates without breaking the welding joint which in this form of construction is permitted to exert a strength that is effectively as great as the material itself in the trussing members and channel plates.

When observing Figs. 1, 3 and 4, it will be noted that I have provided, for instance, in channel members 1 and 2 a series of spaced holes 9 which are preferably arranged in these channel plates so that when punching the same, some of the material is placed up into the channel face to permit holes 10 in the flat fitting portion 5 of the trussing plates to seat down around collar 11 by the punching of holes 9 in channel plates 1 and 2; thus to more effectively center and substantially locate the trussing members in their respective fitting positions in channels 1 and 2.

In addition to this advantage provided in such an arrangement of centering holes 9, it will be noted in Fig. 4 that this fitting connection permits me to utilize a driving screw 12 for holding structural members such as insulation boards or plaster base 13 in their fitting relation with my channel beams.

I am therefore providing not only a trussing beam which in its organization is novel, but also especially providing a trussing beam joint possessing a maximum of strength with a minimum of material, and having thus described the nature of my invention, what I claim is:

In a metallic truss beam having a pair of parallel channel plates with their open faces adjacent and an intermediate zig-zag type trussing member supporting said plates in their spaced relation, a joint forming the bond between said trussing member and said channel plates; said joint comprising a relatively flat portion of said zig-zag trussing member and the contact portion of one of said channel plates each inner-connected by a relatively close fitting relation to the contact portion and a shearing weld along the opposite lateral edges of the flat contact portion of the trussing member and the adjacent inner face surfaces of the respective channel plates; said channel plates each provided with a hole, the material around which is inwardly extending to define a relatively short collar and said flat contact portions of the trussing members each respectively provided with a centering hole to seat down over said collars of the channel plates for centering and rigidly holding the bond between the channel plates and trussing members; whereby when said zig-zag type trussing member is welded at its contact points with said parallel channel plates defining a truss beam, a major strength may be provided in said bonding joint of the beam tending to make the joint permanent and substantial in character.

ELMER A. BRADEN.